US010212106B2

United States Patent
Huang

(10) Patent No.: US 10,212,106 B2
(45) Date of Patent: Feb. 19, 2019

(54) METHOD AND SYSTEM FOR SUBSCRIBING LONG TAIL INFORMATION

(71) Applicant: TENCENT TECHNOLOGY (SHENZHEN) COMPANY LIMITED, Shenzhen (CN)

(72) Inventor: Shuicheng Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 482 days.

(21) Appl. No.: 14/600,392

(22) Filed: Jan. 20, 2015

(65) Prior Publication Data

US 2015/0134762 A1    May 14, 2015

Related U.S. Application Data

(63) Continuation of application No. PCT/CN2014/080946, filed on Jun. 27, 2014.

(30) Foreign Application Priority Data

Jul. 18, 2013  (CN) .......................... 2013 1 0303089

(51) Int. Cl.
  *H04L 12/58*  (2006.01)
  *H04L 29/08*  (2006.01)
(52) U.S. Cl.
  CPC ............ *H04L 51/046* (2013.01); *H04L 67/02* (2013.01); *H04L 67/26* (2013.01)
(58) Field of Classification Search
  CPC .................................................. H04L 51/046
  (Continued)

(56) References Cited

U.S. PATENT DOCUMENTS 5,555,191 A * 9/1996 Hripcsak ................. G06F 17/18
                                                  340/501
6,421,781 B1 * 7/2002 Fox .......................... H04L 29/06
                                                  380/231
(Continued)

FOREIGN PATENT DOCUMENTS

CN        1798032 A   *  7/2006
CN       102456058       5/2012
(Continued)

OTHER PUBLICATIONS

Anderson, "About me", 2017.*
(Continued)

*Primary Examiner* — Ondrej C Vostal
(74) *Attorney, Agent, or Firm* — Anova Law Group, PLLC

(57) ABSTRACT

A long tail information subscribing method is provided. The method includes receiving a to-be-subscribed long tail information type from a client-side, and determining whether an information content matches the long tail information type. The method also includes, when it is determined that an information content matches the long tail information type, sending a long tail information alert message to the client-side to cause the client-side to update an alert display based on the long tail information alert message. Further, the method includes receiving a trigger request message corresponding to the alert display from the client-side, and sending long tail information content corresponding to the trigger request message to the client-side. The information distribution efficiency is thus substantially improved.

20 Claims, 5 Drawing Sheets

(58) Field of Classification Search
USPC .......................................................... 709/207
See application file for complete search history.

(56) References Cited

U.S. PATENT DOCUMENTS

| | | | | |
|---|---|---|---|---|
| 6,807,558 B1* | 10/2004 | Hassett | ............ | G06F 17/30867 707/999.007 |
| 7,764,952 B1* | 7/2010 | Sipher | ................... | H04M 3/42 455/3.06 |
| 7,844,677 B1* | 11/2010 | Asher | .................... | H04L 43/00 455/428 |
| 8,209,291 B1* | 6/2012 | Ma | ...................... | H04L 67/2847 707/641 |
| 8,838,748 B2* | 9/2014 | Nair | ............................ | 709/219 |
| 2001/0039581 A1* | 11/2001 | Deng | .................... | G06F 9/5044 709/226 |
| 2006/0230153 A1* | 10/2006 | Li | .......................... | H04L 67/06 709/227 |
| 2007/0124422 A1* | 5/2007 | Hwang | ................... | H04L 29/06 709/217 |
| 2007/0220575 A1* | 9/2007 | Cooper | ............... | H04N 7/1675 725/118 |
| 2007/0245017 A1* | 10/2007 | Shintai | .................... | H04L 67/26 709/224 |
| 2007/0281689 A1* | 12/2007 | Altman | ............. | G06Q 30/0207 455/435.1 |
| 2008/0077942 A1* | 3/2008 | MacMillan | ......... | G06F 3/04817 719/328 |
| 2008/0195664 A1 | 8/2008 | Maharajh et al. | | |
| 2008/0195665 A1* | 8/2008 | Mason | ................... | H04L 67/22 |
| 2009/0063971 A1* | 3/2009 | White | ................ | G06F 3/04817 715/716 |
| 2009/0133086 A1* | 5/2009 | Trimper | ............. | H04N 7/17318 725/116 |
| 2009/0254661 A1* | 10/2009 | Fullagar | ............ | H04N 7/17354 709/226 |
| 2009/0254662 A1* | 10/2009 | Lee | ......................... | H04L 67/30 709/227 |
| 2009/0319848 A1* | 12/2009 | Thaper | ...................... | G06F 8/64 714/748 |
| 2010/0114739 A1* | 5/2010 | Johnston | ................ | G06Q 30/06 705/26.1 |
| 2010/0179987 A1* | 7/2010 | Sebastian | ............ | H04L 12/1859 709/203 |
| 2010/0198773 A1* | 8/2010 | Wallisch | ................ | G06Q 30/02 706/54 |
| 2010/0306368 A1* | 12/2010 | Gagliardi | .......... | G06F 17/30864 709/224 |
| 2010/0325666 A1* | 12/2010 | Wiser | ................. | H04N 7/17336 725/44 |
| 2010/0332595 A1* | 12/2010 | Fullagar | ............. | H04N 7/17354 709/203 |
| 2011/0212717 A1* | 9/2011 | Rhoads | ............. | G06F 17/30241 455/420 |
| 2012/0052814 A1* | 3/2012 | Gerber | ................ | H04W 76/068 455/67.11 |
| 2012/0117165 A1* | 5/2012 | Shenfield | ................ | H04L 67/06 709/206 |
| 2012/0278476 A1* | 11/2012 | Agrawal | ................ | G06Q 50/01 709/224 |
| 2012/0284765 A1* | 11/2012 | Killick | ................. | H04N 21/274 725/111 |
| 2013/0073358 A1* | 3/2013 | Sandholm | .......... | G06Q 30/0631 705/14.11 |
| 2013/0073686 A1* | 3/2013 | Sandholm | .......... | G06Q 30/0631 709/219 |
| 2013/0262477 A1* | 10/2013 | Monaco | ............ | G06F 17/30684 707/748 |
| 2013/0311555 A1* | 11/2013 | Laoutaris | ............ | H04L 12/6418 709/204 |
| 2013/0346545 A1* | 12/2013 | Petersen | ................. | H04L 67/10 709/217 |
| 2014/0059128 A1* | 2/2014 | Lee | ..................... | G06Q 30/0207 709/204 |
| 2014/0148205 A1* | 5/2014 | Grinshpun | .............. | H04L 69/16 455/466 |
| 2014/0365523 A1* | 12/2014 | Wagner | ............ | G06F 17/30864 707/770 |
| 2015/0082375 A1* | 3/2015 | Onno | ................. | H04N 21/4126 726/1 |
| 2015/0161237 A1* | 6/2015 | Agarwal | ................ | G06Q 10/10 707/749 |

FOREIGN PATENT DOCUMENTS

| | | | |
|---|---|---|---|
| CN | 102930012 A | | 2/2013 |
| CN | 103092856 A | | 5/2013 |
| CN | 103235786 A | * | 8/2013 |

OTHER PUBLICATIONS

Anderson, "Long Tail", 2006.*
Anderson, "The Long Tail", 2006.*
Bray et al., "The long tail of content", 2006.*
Brown, "Reconstructing corrupt Deflated files", 2011.*
DeMarco, "Chapter 3 Using XML in Excel 2007", "Pro Excell 2007 VBA", 2008.*
Wikipedia, "Long tail", 2017.*
Wikipedia, "Push technology", 2017.*
Merriam-Webster, "bilateral", 2017.*
Merriam-Webster, "unilateral", 2017.*
Merriam-Webster, "unilateral", 2018.*
Wikipedia, "Push technology", 2018.*
The World Intellectual Property Organization (WIPO) International Search Report for PCT/CN2014/080946 dated Sep. 17, 2014.
The State Intellectual Property Office of the People's Republic of China (SIPO) Office Action 1 for 201310303089.4 dated Apr. 27, 2018 9 Pages (including translation).

* cited by examiner

METHOD AND SYSTEM FOR SUBSCRIBING LONG TAIL INFORMATION

CROSS-REFERENCES TO RELATED APPLICATIONS

This application is a continuation application of PCT Patent Application No. PCT/CN2014/080946, filed on Jun. 27, 2014, which claims priority of Chinese Patent Application No. 201310303089.4, filed on Jul. 18, 2013, the entire contents of both of which are incorporated by reference herein.

FIELD OF THE INVENTION

The present invention generally relates to information processing technology field and, more particularly, to a long tail information subscribing method and apparatus.

BACKGROUND

In today's information age, many types of information equipment are emerging: fixed-line telephones and mobile phones for voice transmission, servers and personal computers (PCs) for information resource sharing and processing, and various TVs for digital video and data display, and so on. These devices are created to solve practical needs in particular fields. With the integration of consumer electronics, computers, communications (3C), people are placing more and more attentions on studying the comprehensive utilization of the information equipment in various fields, so as to make full use of existing resources to provide people with better services.

The long tail concept is a newly arising theory in the Internet age, presented by American Chris Anderson. According to the long tail theory: due to cost and efficiency factors, when the storage space and circulation channels for a product are broad enough, the production cost will decline so sharply that individuals can make production and, as the dramatic drop of the production cost, almost any previous seemingly low-demand-product can be sold, as long as someone sells it. The joint market share occupied by the products of low demand and low sales can be comparable with the market share of mainstream products, or even larger.

For example, among information obtained by a user through a mobile browser, the living and service type information belongs to the long tail type information. In existing technologies, in order to provide long tail information to the user through various navigation pages, it requires that the user finds and locates the corresponding long tail information directly in the navigation pages.

However, when the user needs to find the long tail information in the navigation page by itself, the efficiency of information dissemination/distribution can be reduced. The disclosed methods and systems are directed to solve one or more problems set forth above and other problems.

BRIEF SUMMARY OF THE DISCLOSURE

Disclosed embodiments of the present invention provide a long tail information subscribing method, apparatus, and system to improve information distribution efficiency.

One aspect of the present disclosure includes a long tail information subscribing method. The method includes receiving a to-be-subscribed long tail information type from a client-side, and determining whether an information content matches the long tail information type. The method also includes, when it is determined that an information content matches the long tail information type, sending a long tail information alert message to the client-side to cause the client-side to update an alert display based on the long tail information alert message. Further, the method includes receiving a trigger request message corresponding to the alert display from the client-side, and sending long tail information content corresponding to the trigger request message to the client-side.

Another aspect of the present disclosure provides a long tail information subscribing apparatus. The long tail information subscribing apparatus includes an information type receiving unit, a push unit and an information transmitting unit. The information type receiving unit is configured to receive a to-be-subscribed long tail information type from a client-side. The push unit is configured to determine whether an information content matches the long tail information type and, when it is determined that an information content matches the long tail information type, to send a long tail information alert message to the client-side to cause the client-side to update an alert display based on the long tail information alert message. The information transmitting unit is configured to receive a trigger request message corresponding to the alert display from the client-side and to send long tail information content corresponding to the trigger request message to the client-side.

The present disclosure further provides a long tail information subscribing system. The long tail information subscribing system includes a client-side, a content server, a content management server and a push server. The client-side is configured to send out a to-be-subscribed long tail information type. The content management server is configured to receive the to-be-subscribed long tail information type from the client-side. The content server is configured to edit information contents and to send the edited information contents to the content management server. Further, the content management server is configured to determine whether an information content matches the long tail information type and, when it is determined that an information content matches the long tail information type, to send a push request to the push server. The push server is further configured to push a long tail information alert message to the client-side. The client-side is further configured to update an alert display based on the long tail information alert message and to send a trigger request message corresponding to the alert display to the content server. The content server is further configured to send long tail information content corresponding to the trigger request message to the client-side.

Other aspects of the present disclosure can be understood by those skilled in the art in light of the description, the claims, and the drawings of the present disclosure.

DETAILED DESCRIPTION

To make the objectives, technical solutions and advantages of the present invention more clearly, the followings, with the accompanying drawings, describe in further detail the present invention.

In the embodiments of the present invention, a client-side refers to a communication terminal with data computing and processing and voice communication functionalities. The client-side includes, but not limited to, a smart phone, a handheld computer with voice communication functions, a tablet computer, a personal digital assistant (PDA), etc., and the client-side may even be a portable smart TV with telephone communication functions.

The above lists some of the specific types of the client-side, but those skilled in the art may realize that the embodiments of the present invention are not limited to the client-side types listed above, and other types of smart terminals and operating systems may also be included.

The smart terminal operating system used by the client-side may be any smart terminal operating system, including, but not limited to, Android, Palm OS, Symbian, Windows mobile, Linux, iPhone (Apple) OS, Black Berry OS 6.0, Windows Phone series, and so on.

In certain embodiments, the smart terminal operating system may specifically be Android operating system, and the smart terminal may further use various versions of Andorid, and those versions include, but not limited to, Astro Boy (Android Beta), Clockwork Robot (Android 1.0), cup cake (Android 1.5), donut (Android 1.6), muffins (Android 2.0/2.1), frozen yogurt (Android 2.2), Gingerbread (Android 2.3), honeycomb (Android 3.0), ice cream sandwich (Android 4.0), jelly Bean (Android 4.1), etc.

The above lists specific versions of the Android platform, but those skilled in the art may realize that the embodiments of the present invention are not limited to the Android versions listed above, and other versions of Android-based software architectures can be included.

Figure 9:
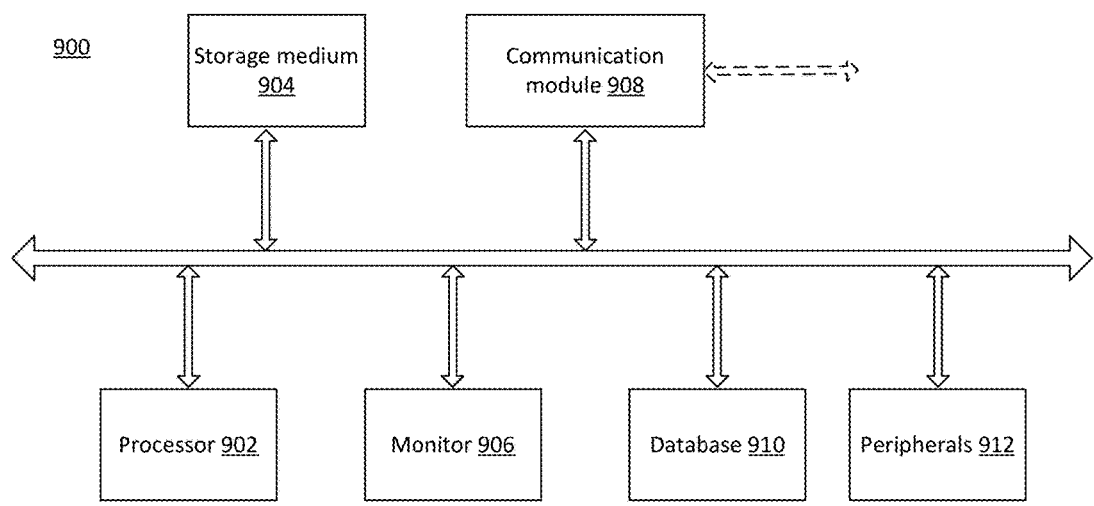
FIG. 9 shows a block diagram of an exemplary computing system according to the disclosed embodiments.

FIG. 9 shows a block diagram of an exemplary computer system 900 capable of implementing the client-side system and/or a server system communicating with the client-side.

As shown in FIG. 9, computer system 900 may include a processor 902, a storage medium 904, a monitor 906, a communication module 908, a database 910, and peripherals 912. Certain devices may be omitted and other devices may be included.

Processor 902 may include any appropriate processor or processors. Further, processor 902 can include multiple cores for multi-thread or parallel processing. Storage medium 504 may include memory modules, such as ROM, RAM, flash memory modules, and erasable and rewritable memory, and mass storages, such as CD-ROM, U-disk, and hard disk, etc. Storage medium 904 may store computer programs for implementing various processes, when executed by processor 902.

Further, peripherals 912 may include I/O devices such as keyboard and mouse, and communication module 908 may include network devices for establishing connections through the communication network. Database 910 may include one or more databases for storing certain data and for performing certain operations on the stored data, such as database searching.

Figure 1:
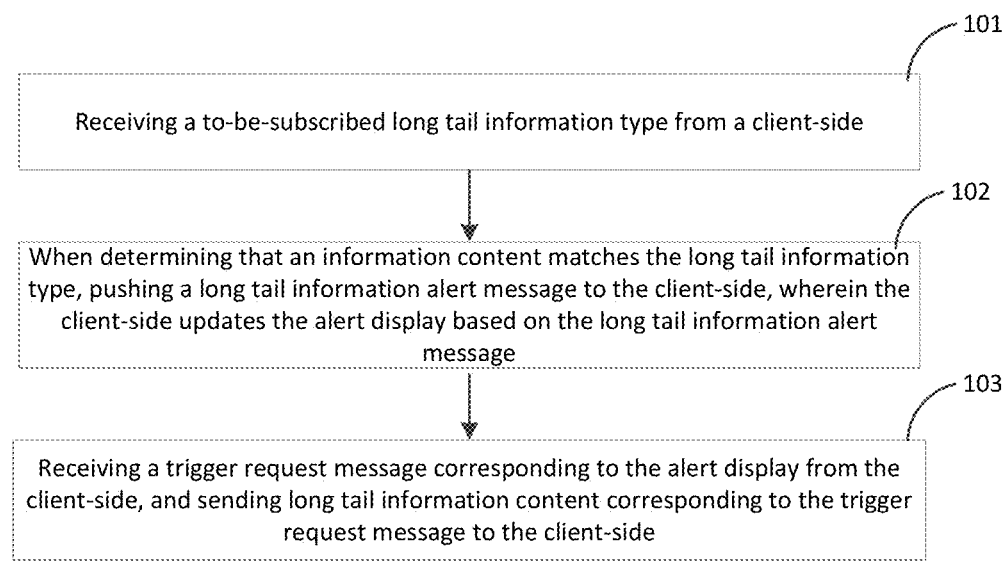
FIG. 1 illustrates a flow chart of a long tail information subscribing method according to disclosed embodiments of the present invention.

In operation, computer system 900 may provide a long tail information subscribing process for a user to subscribe desired long tail type of information. FIG. 1 illustrates a flow chart of an exemplary long tail information subscribing process according to disclosed embodiments of the present invention.

As shown in FIG. 1, the long tail information subscribing process may include the following steps.

At the beginning, in Step 101, receiving a desired long tail information type to be subscribed from a client-side.

Here, the long tail information type refers to an information content which matches a long tail effect. In the long tail effect, "head" and "tail" are two statistical terms. In a normal statistical curve, the protruding portion in the middle of the normal curve is called the "head"; and the relatively flat part on both sides of the curve is called the "tail". For new competition, when viewed from the perspective of people's demand, most of the demand will be concentrated in the head, and this part can be called popular. While demand in the tail of the distribution is the personalized and scattered small demand, and this part of the differential and small amount of demand forms a long "tail" on the demand curve. The so-called long tail effect is the quantity: when all the non-popular market shares are added up, it can form a larger scale effect.

For example, living service type information is typical long tail information, specifically including weather forecast information, dressing index information, car wash index information, and so on. Other type of long tail information may also be included.

In one embodiment, a server may specifically receive the to-be-subscribed long tail information type from a client-side browser. For example, by adding a long tail information entrance in the browser's quick link bar and setting the to-be-subscribed long tail information type through the entrance, the to-be-subscribed long tail information type may be received from the client-side browser.

In one embodiment, the server may provide the client-side browser with long tail information subscription option data. Based on the long tail information subscription option data, the client-side browser displays a subscription option list of the long tail information. Further, the client-side receives a select operation performed by the user on the long tail information subscription option list, and determines a to-be-subscribed long tail information type based on the select operation. The server then receives the to-be-subscribed long tail information type from the client-side browser and records the subscribed long tail information type.

In STEP 102, when an information content is determined to match the long tail information type, a long tail information alert message is pushed to the client-side, and the client-side updates an alert display based on the long tail information alert message.

Here, the server may receive the information content from various information sources, and may determine whether the information content matches the subscribed long tail information type. When the server determines that the information content matches the subscribed long tail information type, the server pushes the long tail information alert message to the client-side. The client-side displays the updated alert based on the long tail information alert message. These various information sources may include any third-party content providers, such as various portal websites.

In one embodiment, a number of the information content matching the subscribed long tail information type may be further determined, and the client-side displays the number of the information content in the alert display based on the long tail information alert message.

The alert display may be displayed on the client-side browser, for example, in the form of an alert icon. Specifically, the alert display may include the number new information contents and/or a summary or summaries of the new information content. When the to-be-subscribed long tail information type is received from the client-side browser, the client-side browser can update the alert display based on the alert message of the subscribed long tail information type.

Here, when the server determines that the information content matches the subscribed long tail information type, the server takes the initiative to push the long tail information alert message to the client-side. As used herein, the term "push" is the technology where, based on client-server mechanism, the server initiates the transmission of information to the client-side. Compared with the traditional "pull" technology, the difference includes that: "push" is to send the information unilaterally by the server, and "pull" is to request the information unilaterally by the client-side. In "push" applications, before the server sends any content to the client-side, there is no request from the client-side. In other words, the "push" transaction is initiated by the server without the client-side's request. The nature of "push" is to allow the information to proactively seek users, its advantages lie in the initiative and timeliness of information. By using this "push" technology, the information can be pushed to the user as soon as possible.

In Step 103, a trigger request message corresponding to the alert display is received from the client-side, and the long tail information corresponding to the trigger request is sent to the client-side.

When the alert is displayed on the client-side, a user can trigger the alert display by an interaction action, such as clicking on the alert display, etc., to get the specific content of the alert. The server from the network side may receive the trigger request message corresponding to the alert display from the client-side, and sends the corresponding long tail information of the trigger request to the client-side.

The communication connection between the client-side and the server may be implemented in various ways, including, but not limited to, Bluetooth, infrared communication link, Wi-Fi connection, and GPRS connection, etc. Based on the communication connection between the client-side and the server, the instruction transmitting and content sharing may be realized.

Figure 2:
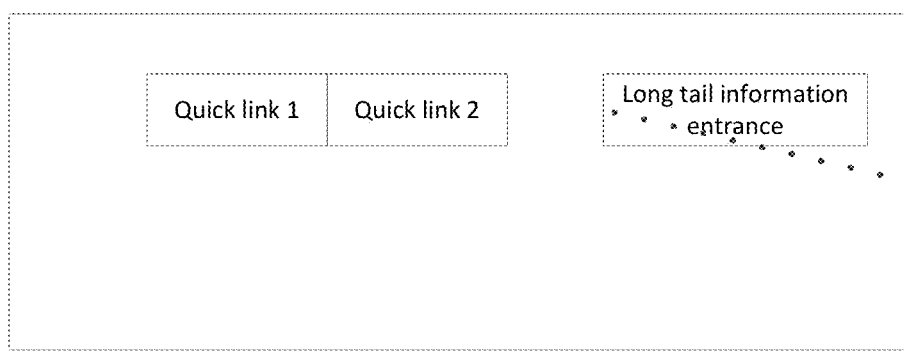
FIG. 2 illustrates an exemplary long tail information entrance according to disclosed embodiments of the present invention.
Figure 3:
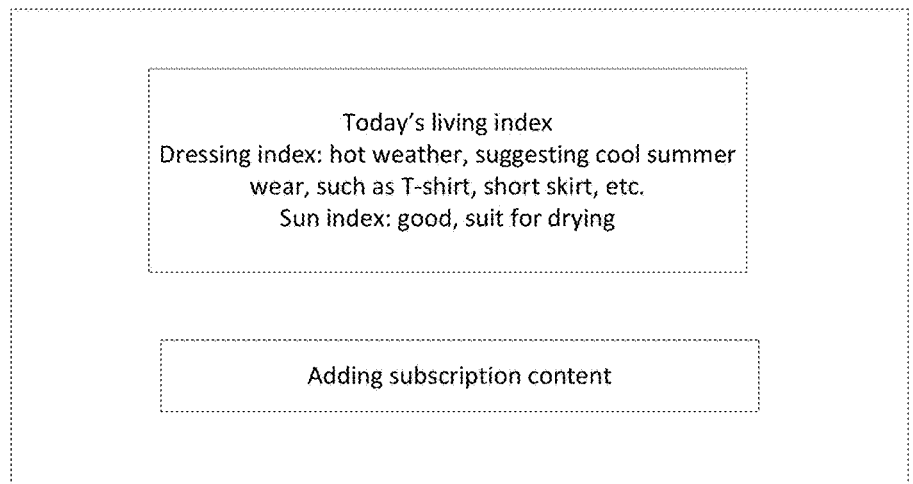
FIG. 3 illustrates an exemplary long tail information display according to disclosed embodiments of the present invention.
Figure 4:
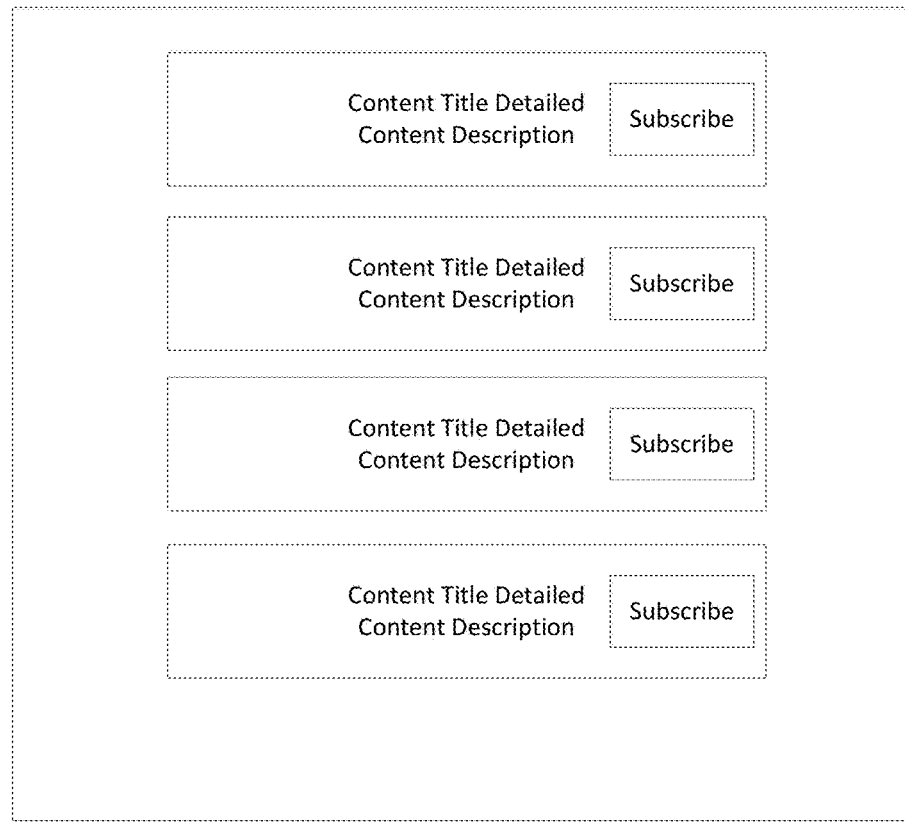
FIG. 4 illustrates a schematic diagram of an exemplary long tail information subscribing interface according to disclosed embodiments of the present invention.

FIG. 2 shows an exemplary view of a long tail information entrance according to disclosed embodiments of the present invention. FIG. 3 illustrates an exemplary display of a long tail information subscribing interface according to disclosed embodiments of the present invention. And FIG. 4 provides an exemplary view of subscribing long tail information according to disclosed embodiments of the present invention.

As shown in FIG. 2, the long tail information entrance can be set on a start page of a client-side browser. For example, the long tail information entrance can be set on a quick link screen on the start page of the client-side browser. The entrance may be implemented in the form of image or picture, a superscript at the upper right corner may prompt the user with a number of current subscribed but unread messages.

As shown in FIG. 3, the long tail information is displayed in a main page. The main page shows contents in the form of cards. A card is generated for each long tail information type or item subscribed. The card only shows the day's information content pushed by a content provider. When there is no new push for the current day, the information content from the previous day is displayed. The cards are sorted in the order of the information update time with the latest update placed at the top. For an unread content, a "new" superscript is added at the upper right corner of the card. The length of each card is not larger than a limited value. Clicking on a card can jump to a full information page.

Clicking on an "Add" button in the main page as shown in FIG. 3 can jump to a subscription page. Different living service contents may be subscribed in the subscription page. After each subscription, a corresponding card is generated in the main page.

As shown in FIG. 4, an exemplary view of an interface subscribing long tail information is provided. By triggering a subscribing control in the subscription page, a to-be-subscribed long tail information type identifier is sent to the server on the network side, and the server stores the to-be-subscribed long tail information type identifier in a type identifier table.

Based on the above detailed descriptions, the disclosed embodiments of the present invention also provide a long tail information subscribing apparatus.

Figure 5:
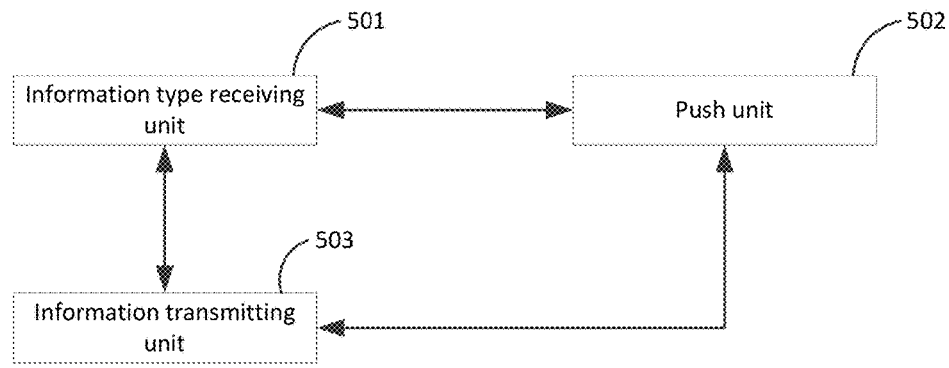
FIG. 5 illustrates a schematic diagram of a long tail information subscribing apparatus according to disclosed embodiments of the present invention.

FIG. 5 provides a schematic diagram of a long tail information subscribing apparatus according to disclosed embodiments of the present invention. As shown in FIG. 5, the apparatus includes an information type receiving unit 501, a push unit 502, and an information transmitting unit 503. Other units may also be included.

The information type receiving unit 501 is configured to receive a to-be-subscribed long tail information type from a client-side.

The push unit 502 is configured to push a long tail information alert message to the client-side when any information content is determined to match the long tail information type, and to cause the client-side to update an alert display according to the long tail information alert message.

The information transmitting unit 503 is configured to receive a trigger request message of the alert display from the client-side and to transmit the long tail information corresponding to the trigger request to the client-side.

In one embodiment, the push unit 502 is further configured to store the to-be-subscribed long tail information type identifier in a type identifier table, and to determine whether any information content includes a type identifier matching any long tail information type identifier stored in the type identifier table. If the push unit 502 determines the information content includes such type identifier, it determines that the received information content matches the subscribed long tail information type identifier.

In one embodiment, the push unit 502 is further configured to determine a number of the information contents matching the subscribed long tail information type, and to push the long tail information alert message to the client-side. The long tail information alert message includes the number of the information contents of the long tail information type and the client-side displays the number of the information content on the alert display.

In one embodiment, the information type receiving unit 501 is configured to receive the to-be-subscribed long tail information type. The push unit 502 is configured to push the long tail information alert message to the client-side, and the client-side updates the alert display according to the long tail information alert message.

In one embodiment, the information type receiving unit 501 is configured to provide the client-side browser with long tail information subscription option data. Based on the long tail information subscription option data, the client-side browser displays a subscription option list of the long tail information. Further, the client-side receives a select operation performed by the user on the long tail information subscription option list, and determines a to-be-subscribed long tail information type based on the select operation. The server then receives the to-be-subscribed long tail information type from the client-side browser and records the subscribed long tail information type.

Based on the above detailed descriptions, the disclosed embodiments of the present invention also provide a long tail information subscribing system.

In the long tail information subscribing system, at the beginning, a content provider edits information contents in a content server and submits the to-be-sent information contents of the day (for example, the daily sending limit may be 1-3 items of the information contents) to a content management server. The content management server may determine whether the contents are legitimate (e.g., determining whether the contents are complete, whether the contents contain illegal characters, etc.), and may send a push request to a push server after determining that the contents are legitimate. After the push server receives the request, the push server sends a push notification to a user who subscribes the content. When the user receives the push notification, an alert prompt (e.g., a superscript) is generated on an icon of a long tail information entrance in a start page of a client-side browser. After the user clicks on the icon, a page is opened and the content, which is submitted by the content provider to the content management server, is displayed in a card at the top of this page. If the user clicks on the card, the card opens a content detail page.

Figure 6:
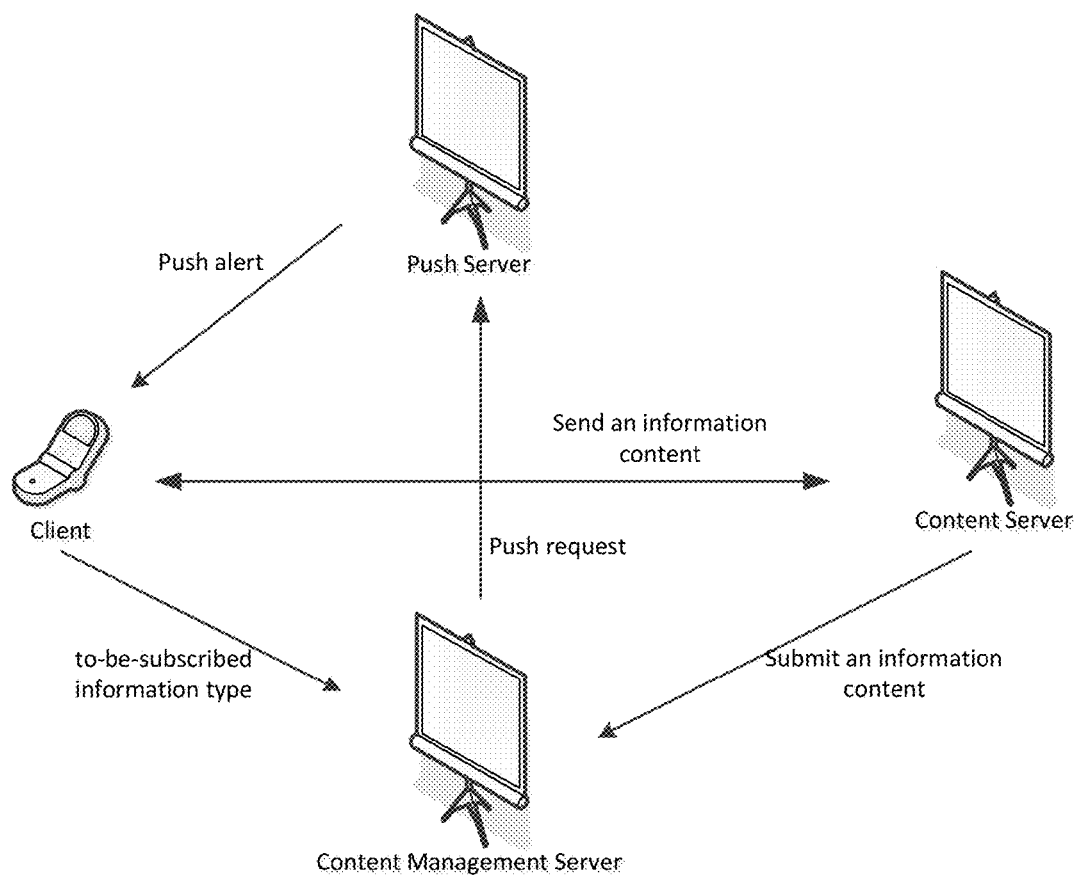
FIG. 6 illustrates a schematic diagram of a long tail information subscribing system according to disclosed embodiments of the present invention.

FIG. 6 provides a long tail information subscribing system according to disclosed embodiments of the present invention. As shown in FIG. 6, the system includes a client-side, a content server, a content management server, and a push server. Certain components may be omitted and other components may be included.

The content server is configured to edit an information content and to send the edited information content to the content management server.

The content management server is configured to receive a to-be-subscribed long tail information type and, when determining that the information content sent by the content management server matches the subscribed long tail information type, to send a push request to the push server.

The push server is configured to push a long tail information alert message to the client-side.

The client-side is configured to update an alert display according to the long tail information alert message and to send a trigger request message corresponding to the alert display of the long tail information to the content server.

The content server is configured to send the long tail information corresponding to the trigger request message to the client-side.

In one embodiment, the content management server is configured to store a to-be-subscribed long tail information type identifier in a type identifier table, and to determine whether the information content has a type identifier that matches the long tail information type identifier stored in the type identifier table. And if the information content has the type identifier that matches the stored long tail information type identifier, then the information content is determined to match the long tail information type.

In one embodiment, the content management server is configured to receive the to-be-subscribed long tail information type from the client-side browser. The client-side is configured to update the alert display based on the long tail information alert message.

In one embodiment, the content management server is configured to provide the client-side browser with long tail information subscription option data. Based on the long tail information subscription option data, the client-side browser displays a subscription option list of the long tail information. Further, the client-side receives a select operation performed by the user on the long tail information subscription option list, and determines a to-be-subscribed long tail information type based on the select operation. The content management server then receives the to-be-subscribed long tail information type from the client-side browser and records the subscribed long tail information type.

Based on the above detailed descriptions, the disclosed embodiments of the present invention also provide another long tail information subscribing method. The long tail information subscribing method may be implemented in a terminal which submits an information subscribing request and displays a subscribed information content and/or type.

Figure 7:
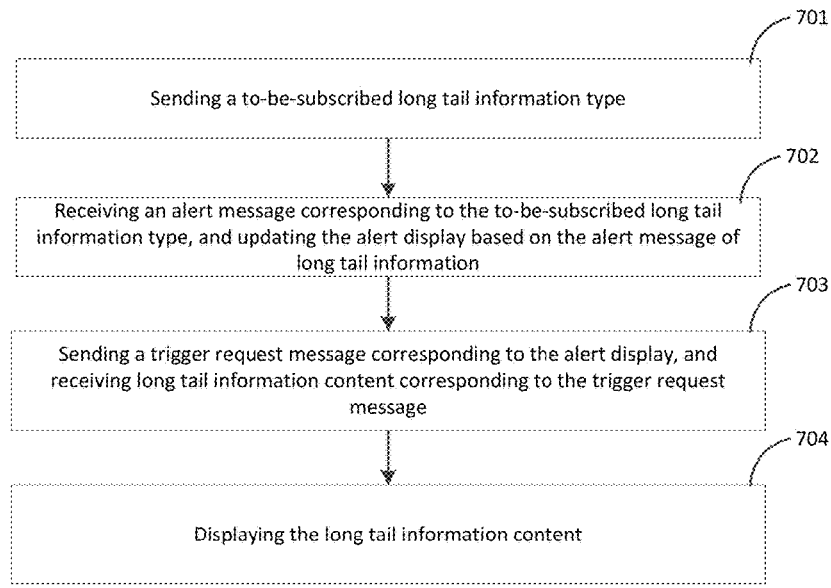
FIG. 7 illustrates a flow chart of another long tail information subscribing method according to disclosed embodiments of the present invention.

FIG. 7 illustrates a flow chart of another long tail information subscribing method according to disclosed embodiments of the present invention. As shown in FIG. 7, the method may include following steps.

Step 701: sending out a to-be-subscribed long tail information type.

Step 702: receiving a long tail information alert message corresponding to the to-be-subscribed long tail information type, and updating an alert display.

Step 703: sending out a trigger request message corresponding to the alert display and receiving the long tail information corresponding to the trigger request message.

Step 704: displaying the long tail information.

In one embodiment, the terminal may set the to-be-subscribed long tail information type in a browser page, send the to-be-subscribed long tail information type through the browser page, update the alert display based on the long tail information alert message, and display the long tail information in the browser page.

In another embodiment, long tail information subscription option data can be received through the browser and, based on the long tail information subscription option data, the browser can display a subscription option list of the long tail information. Further, a select operation performed by the user on the long tail information subscription option list can be received and a to-be-subscribed long tail information type can be determined based on the select operation.

Figure 8:
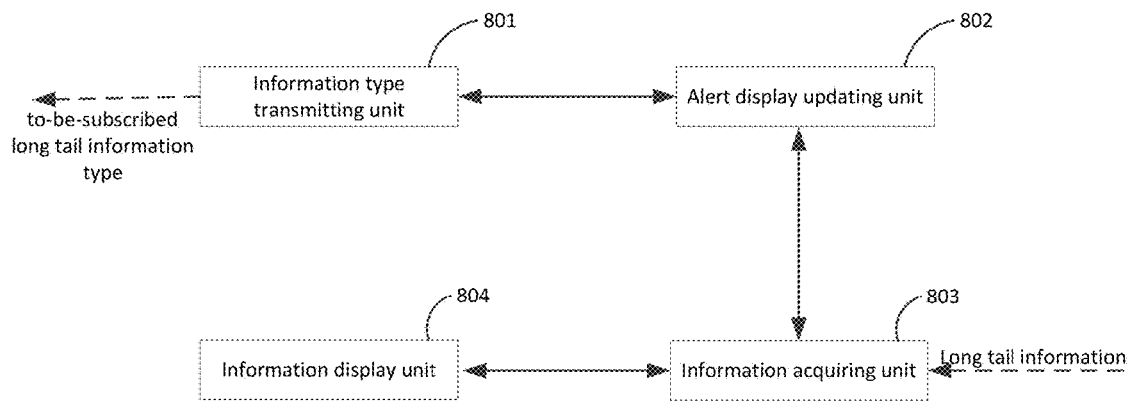
FIG. 8 illustrates a schematic diagram of another long tail information subscribing apparatus according to disclosed embodiments of the present invention.

Based on the above detailed descriptions, the disclosed embodiments of the present invention also provide another long tail information subscribing apparatus. This apparatus may be implemented in a terminal which submits an information subscribing request and displays a subscribed long tail information content and/or type. FIG. 8 illustrates a schematic diagram of another long tail information subscribing apparatus according to disclosed embodiments of the present invention.

As shown in FIG. 8, the long tail information subscribing apparatus may include an information type transmitting unit 801, an alert display updating unit 802, an information acquiring unit 803 and an information display unit 804.

The information type transmitting unit 801 is configured to transmit a to-be-subscribed long tail information type. The alert display updating unit 802 is configured to receive a long tail information alert message corresponding to the to-be-subscribed long tail information type and to update an alert display according to the long tail information alert message.

The information acquiring unit 803 is configured to transmit a trigger request message corresponding to the alert display and to receive the corresponding long tail information of the alert display. The information display unit 804 is configured to display the received long tail information.

In one embodiment, the information type transmitting unit 801 is further configured to receive long tail information subscription option data from a browser page and, based on the long tail information subscription option data, to display a subscription option list of the long tail information on the browser page. Further, information type transmitting unit 801 is further configured to receive a select operation performed by the user on the long tail information subscription option list, and to determine a to-be-subscribed long tail information type based on the select operation.

The disclosed embodiments of the long tail information subscribing method and apparatus can be implemented in various ways. For example, by following certain standardized application program interfaces, the long tail information subscribing method may be coded as a plug-in program for PCs and mobile terminals, etc., or may be packaged as an application software program for users to download. When coded as a plug-in program, the method may be implemented as ocx, dll, cab and many other plug-ins, such as Flash plug-in, RealPlayer plug-in, MMS plug-in, MIDI stave plug-in, and ActiveX plug-in, etc.

The long tail information subscribing method according to disclosed embodiments may be stored in various storage media in the form of instructions or sets of instructions. These storage media include, but not limited to, floppy disk, CD-ROM, DVD, hard disk, flash drive, U disk, CF card, SD card, MMC card, SM card, Memory Stick, and xD card, etc.

In addition, the long tail information subscribing method according to disclosed embodiments of the present invention may also be applied to flash-based storage media (Nand flash), for example: U disk, CF card, SD card, SDHC card, MMC card, SM card, memory Stick, xD card, etc.

Therefore, according to disclosed embodiments, a long tail information subscribing method may include: receiving a to-be-subscribed long tail information type from a client-side; when determining that an information content matches the long tail information type, sending a long tail information alert message to the client-side; receiving a trigger request message corresponding to the alert display from the client-side; and sending the long tail information corresponding to the trigger request to the client-side. Further, the long detail information can be provided to the user by proactive or unilaterally push, improving information distribution efficiency.

Moreover, the disclosed embodiments may be implemented in various terminals, and may further be implemented across platforms and across terminals, the scope of the applications is not restricted by the disclosed embodiments.

The above describes some preferred embodiments of the present invention, it is not intended to limit the scope of the present invention. Within the spirit and principles of the present invention, any modifications, equivalent replacements, or improvements, etc., of the present invention should be included within the scope of the present invention.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods, apparatus, and systems, a to-be-subscribed long tail information type is received from a client-side by a server. When the server determines that an information content matches the subscribed long tail information type, the server sends a long tail information alert message to the client-side. Further, the server receives a trigger request message corresponding to the alert display from the client-side; and sends the long tail information corresponding to the trigger request to the client-side. The long detail information can be provided to the user by proactive or unilaterally push, improving information distribution efficiency.

What is claimed is:

1. A long tail information subscribing method, comprising:

providing, by a management server, a user interface having a subscription option list displayed in a browser of a client-side;

receiving, by the management server, a long tail information subscription type from the client-side, wherein the long tail information subscription type is selected by a user from the subscription option list displayed in the user interface of the browser;

adding a long tail information entrance on the client-side, wherein the long tail information entrance corresponds to a main page showing contents in a card form in the user interface of the browser, the card form is generated for the long tail information subscription type, and a card is generated in the user interface of the browser for each of the long tail information subscription type;

determining, by the management server, whether an information content stored in a content providing server matches the long tail information subscription type from the client-side;

when it is determined that the information content stored in the content providing server matches the long tail information subscription type from the client-side, sending, by the management server, a pushing request to a push server;

sending an alert message, by the push server based on the pushing request from the management server, to the client-side to cause the client-side to update an alert display shown in the user interface of the browser based on the alert message, wherein the alert display shown in the user interface of the browser includes a summary of new information content, the pushing request from the management server is sent to the push server, and the alert message from the push server is sent to the client-side;

receiving, by the content providing server, a trigger request message corresponding to the alert display shown in the user interface of the browser from the client-side, wherein the trigger request message is transmitted from the client-side to the content providing server; and sending, by the content providing server, a long tail information content corresponding to the trigger request message to the client-side shown in the user interface of the browser, wherein the long tail information content is pushed to the client-side by the content providing server to improve a distribution efficiency.

2. The method according to claim 1, wherein:

the method further comprises:

storing a type identifier of the long tail information subscription type in a type identifier table; and determining whether the information content matches the long tail information subscription type further includes:

determining whether the information content contains a type identifier that matches the long tail information type identifier stored in the type identifier table;

when it is determined that the information content contains the type identifier that matches the long tail information type identifier stored in the type identifier table, determining that the information content matches the long tail information subscription type.

3. The method according to claim 2, further comprising:

updating, by the client-side, the alert display based on the alert message; and determining a number of information contents matching the long tail information subscription type, wherein updating further includes:

displaying the number of information contents on the alert display.

4. The method according to claim 2, further comprising:

updating, by the client-side, the alert display based on the alert message, wherein receiving the long tail information subscription type from the client-side includes: receiving the long tail information subscription type from a client-side browser on the client-side; and wherein updating further includes: updating, by the client-side browser, the alert display based on the alert message.

5. The method according to claim 4, wherein receiving the long tail information subscription type from the client-side browser includes:

providing, by the management server, the client-side browser with long tail information subscription option data;

based on the long tail information subscription option data, the client-side browser displaying, by the client-side browser, a subscription option list of the long tail information;

receiving, by the client-side browser, a select operation performed by a user on the long tail information subscription option list;

determining, by the client-side browser, the long tail information subscription type based on the select operation; and receiving, by the management server, the long tail information subscription type from the client-side browser.

6. The method according to claim 1, wherein the long tail information subscription type refers to an information content matching a long tail effect, and the long tail effect is a flat part on both sides of a normal statistical curve of information.

7. The method according to claim 1, wherein, before the push server sends the alert message to the client-side, there is no request sent from the client-side to the push server.

8. A long tail information subscribing apparatus, comprising:

a client-side comprising a user interface having a subscription option list displayed in a browser, the user interface of the browser having a long tail information entrance corresponding to a main page showing contents of a long tail information subscription type in a card form, and a card is generated in the user interface of the browser for each of the long tail information subscription type;

an information type receiving unit configured to receive the long tail information subscription type from the client-side, receiving an information content from an information transmitting unit, and determining whether the information content matches the long tail information subscription type and, when it is determined that the information content matches the long tail information subscription type, to send a pushing request to a push unit, wherein the long tail information subscription type is selected by a user from the subscription option list displayed in the user interface of the browser;

the push unit sending an alert message to the client-side based on the pushing request from the information type receiving unit to cause the client-side to update an alert display shown in the user interface of the browser based on the alert message, wherein the alert display shown in the user interface of the browser includes a summary of new information content, the pushing request from the information type receiving unit is sent to the push unit, and the alert message from the push unit is sent to the client-side; and the information transmitting unit configured to receive a trigger request message corresponding to the alert display from the client-side shown in the user interface of the browser and to send a long tail information content corresponding to the trigger request message to the client-side, wherein the trigger request message is transmitted from the client-side to the information transmitting unit, and the long tail information content is pushed to the client-side from the information transmitting unit to improve a distribution efficiency.

9. The apparatus according to claim 8, wherein the push unit is further configured to:

store a type identifier of the long tail information subscription type in a type identifier table;

determine whether the information content contains a type identifier that matches the long tail information type identifier stored in the type identifier table; and when it is determined that the information content contains the type identifier that matches the long tail information type identifier stored in the type identifier table, determine that the information content matches the long tail information subscription type.

10. The apparatus according to claim 9, wherein:
the push unit is configured to determine a number of information contents matching the long tail information subscription type, to push the alert message to the client-side, wherein the alert message contains the number of information contents matching the long tail information subscription type, to cause the client-side to display the number of the information contents on the alert display.

11. The apparatus according to claim 9, wherein:
the information type receiving unit is configured to receive the long tail information subscription type from a client-side browser; and
the push unit is configured to push the alert message to the client-side browser to cause the client-side browser to update the alert display according to the alert message.

12. The apparatus according to claim 11, wherein:
the information type receiving unit is configured to provide long tail information subscription option data to the client-side browser to cause the client-side browser to display a subscription options list of the long tail information, to receive a select operation performed by a user on the long tail information subscription option list, and to determine the long tail information subscription type based on the select operation; and
the information type receiving unit is further configured to receive the long tail information subscription type from the client-side browser.

13. The apparatus according to claim 8, wherein the long tail information subscription type refers to an information content matching a long tail effect, and the long tail effect is a flat part on both sides of a normal statistical curve of information.

14. The apparatus according to claim 8, wherein, before the push server sends the alert message to the client-side, there is no request sent from the client-side to the push server.

15. An long tail information subscribing system, comprising:
a client-side comprising a user interface having a subscription option list displayed in a browser, the user interface of the browser configured to send out a long tail information subscription type and have a long tail information entrance corresponding to a main page showing contents of the long tail information subscription type in a card form, and a card is generated in the user interface of the browser for each of the long tail information subscription type;
a management server configured to receive the long tail information subscription type from the client-side;
a push server; and
a content providing server configured to edit information contents and to send the edited information contents to the management server, wherein:
the long tail information subscription type is selected by a user from the subscription option list displayed in the user interface of the browser;
the management server is further configured to determine whether an information content matches the long tail information subscription type and, when it is determined that an information content matches the long tail information subscription type, to send a pushing request to the push server;
the push server is further configured to send an alert message to the client-side shown in the user interface of the browser, wherein the pushing request from the management server is sent to the push server, and the alert message from the push server is sent to the client-side; and the client-side is further configured to update an alert display shown in the user interface of the browser based on the alert message and to send a trigger request message corresponding to the alert display to the content providing server, wherein the alert display shown in the user interface of the browser includes a summary of new information content, the trigger request message is transmitted from the client-side to the content providing server; and the content providing server is further configured to send a long tail information content corresponding to the trigger request message to the client-side, wherein the long tail information content is pushed to the client-side by the content providing server to improve a distribution efficiency.

16. The system according to claim 15, wherein the management server is configured to:
store a type identifier of the long tail information subscription type in a type identifier table;
determine whether the information content contains a type identifier that matches the long tail information type identifier stored in the type identifier table; and
when it is determined that the information content contains the type identifier that matches the long tail information type identifier stored in the type identifier table, determine that the information content matches the long tail information subscription type.

17. The system according to claim 16, wherein:
the management server is configured to receive the long tail information subscription type from a client-side browser on the client-side; and
the client-side browser is configured to update the alert display based on the alert message.

18. The system according to claim 17, wherein:
the management server is further configured to provide long tail information subscription option data to the client-side browser;
the client-side browser is configured to display a subscription option list of the long tail information based on the long tail information subscription option data, to receive a select operation performed by a user on the long tail information subscription option list, and to determine the long tail information subscription type based on the select operation; and
the management server is further configured to receive the long tail information subscription type from the client-side browser.

19. The system according to claim 15, wherein the long tail information subscription type refers to an information content matching a long tail effect, and the long tail effect is a flat part on both sides of a normal statistical curve of information.

20. The system according to claim 15, wherein, before the push server sends the alert message to the client-side, there is no request sent from the client-side to the push server.

* * * * *